United States Patent Office 3,697,485
Patented Oct. 10, 1972

3,697,485
PROCESS FOR PREPARING POLYISOCYANURATES AND POLYURETHANES USING ORGANIC ORTHOBORATE CATALYSTS
George M. Rambosek, Maplewood, Minn., Michael George Allen, Hudson, Wis., and George Van Dyke Tiers, St. Paul, Minn., assignors to Minnesota Mining and Manufacturing Company, St. Paul, Minn.
No Drawing. Filed July 10, 1969, Ser. No. 840,834
Int. Cl. C08g 22/34, 22/40
U.S. Cl. 260—77.5 NC                    22 Claims

ABSTRACT OF THE DISCLOSURE

Isocyanates are trimerized, polymerized, or reacted with polyols, in the presence of a new catalyst comprising an organic orthoborate and an alcoholate or phenolate salt to produce isocyanurates, polyisocyanurates, urethane-modified polyisocyanurates, or isocyanurate-modified polyurethanes.

---

This invention relates to a process for trimerizing mono-isocyanates or polyisocyanates to produce isocyanurates or polyisocyanurates. In another aspect, it relates to a process for reacting polyisocyanates with polyols to produce crosslinked isocyanurate-modified polyurethanes or urethane-modified polyisocyanurates having useful properties, such as relatively high temperature stability, hydrolytic stability, and impact strength. In a still further aspect, it relates to catalyst compositions useful in effecting polymerization or cure of isocyanates or polyisocyanate-polyol reaction mixtures.

The trimerization of aliphatic or aromatic mono-isocyanates, e.g. phenyl isocyanate, to produce isocyanurates is well known. A host of trimerization catalysts have been disclosed, used, or patented (see "Polyurethanes: Chemistry and Technology," Part 1, by J. H. Saunders and K. C. Frisch, Interscience Pub., New York (1962), p. 94, and U.S. Pat. Nos. 2,979,485, 2,993,870, and 3,381,008). Such isocyanurates or trimers are useful as chemical intermediates in the polymer art. Catalytic trimerization of polyisocyanates, including isocyanate-terminated prepolymers, to produce polyisocyanurates and urethane-modified polyisocyanurates is also known (see U.S. Pat. Nos. 2,965,614, 3,206,352, 3,211,704, and 3,280,066). Trimerization of isocyanates is especially of interest in urethane polymer chemistry to produce isocyanurate-modified polyurethanes and urethane-modified polyisocyanurates (see U.S. Pat. Nos. 3,168,483 and 3,179,626) or mixed polyurethanes-polyisocyanurates.

Though many of the catalysts disclosed as useful in the above-described prior art processes have merit, many of them have undesirable features. Tertiary amines generally have unpleasant odors which detract from their usefulness. Heavy metal catalysts are often toxic or leave toxic residues in the products resulting from their use. Xanthates contain sulfur and are capable of slowly decomposing giving rise to disagreeable odors. Other catalysts are corrosive and hazardous to use and many of the known catalysts are not active at room temperature or have very limited solubility in the reaction mixtures. Some catalysts are not applicable in the formation of foamed products. And many of the catalysts are limited in utility to production of products having limited physical properties.

Briefly speaking, according to this invention, isocyanates, including mixtures thereof with polyols, can be readily converted into isocyanurate products by catalyzing the trimerization of isocyanates with a catalyst formed by admixture of an organic borate ester, such as tri-hexylene biborate, with an alcoholate or phenolate salt. By the practice of this invention, mono-isocyanates, such as phenyl isocyanate, can be trimerized to isocyanurate compounds and polyisocyanates, such as toluene diisocyanate, can be polymerized to form polyisocyanurates. Of particular, importance, polyisocyanates, especially in the form of isocyanate-capped or terminated prepolymers, and polyisocyanates in admixture with polyols, such as polyalkylene ether glycols or hydroxy polyesters, can be polymerized readily in the presence of the catalyst of this invention to form crosslinked or cured isocyanurate-modified polyurethanes or urethane-modified polyisocyanurates (or mixed polyurethane-polyisocyanurates), which products have relatively high temperature resistance, hydrolytic stability, and are mechanically quite strong.

Generally, catalysts of this invention do not have disagreeable odors and are not hazardous in use, nor do they leave highly toxic residues in the products formed. Some of these catalysts have the admirable property of being active upon admixture at room temperature with the isocyanate or polyisocyanate-polyol reactants and can be readily used in so-called "one-shot" applications. In the production of polymers with isocyanurate and urethane linkages, the catalysts have wide applicability and polymer products with different desirable properties, such as hardness, resiliency, elongation, impact strength, electrical dissipation factor, dielectric constant, tensile strength, high and low temperature stability, and hydrolytic stability, can be produced from reaction mixtures having a wide range of NCO/OH equivalent ratios and such ratios do not have to be closely controlled to insure production of products with desirable properties. Polymer products with particular physical properties can be produced by selecting the proper NCO/OH ratio and it is not necessary in the production of many of such products to vary or change the type of polyol used in order to obtain such properties.

Depending on the degree of cross-linking and the distance between cross-links, the urethane-isocyanurate products of this invention can range from soft solids or rubbers to hard plastics or resins. Such products can be produced in non-porous form or in cellular or foamed form with open or closed cells, and can be either filled or non-filled. Such products, depending upon their form, can be used as coatings, films, brush and carpet backings. They are also useful as adhesives, laminating resins, and as electrical potting resins. Structural or engineering products can also be formed from these products, for example, panels, walls, beams, flooring, tile, etc. In general, these products can be used in various applications heretofore enjoyed by conventional polyurethanes, where their improved properties make them much more useful.

The catalysts of this invention are coordination compounds or complexes formed for example by admixing orthoborates, derived from monohydric alcohols, 1,2- or 1,3-glycols or monohydric phenols, with alcoholate or phenolate salts. As such, they are tetracovalent compounds of boron, one of the ligands of which is a unidentate ligand derived from said alcoholate or phenolate salt and linked to the boron by the alcoholic or phenolic oxygen atom thereof. For example, in the case of the catalyst derived from a monohydric alcohol or phenol, the tetra-covalent compound will have the formula

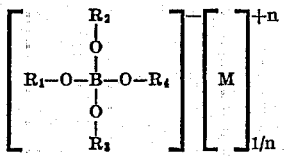

where $R_1$, $R_2$, and $R_3$ are alkyl or aryl radicals of the orthoborate, $R_4$ is an alkyl or aryl derived from the alcoholate or phenolate salt, M is the cation thereof, and $n$ is the valence of said cation.

Many of the organic orthoborates used as catalyst components in this invention are known (see "Organoboron Chemistry," vol. 1, by H. Steinberg, Interscience Publishers, New York, 1964).

The orthoborates used to make the catalyst or this invention representatively include the tri-substituted boranes, $B(OR)_3$, derived from monohydrice alcohols or phenols, where R is alkyl, alkenyl, or aryl, the three substitutent R's being the same or different. Representative orthoborates of this class which can be used include those of alkanols, e.g. with 1–18 carbon atoms, such as methanol, ethanol, propanol, isopropanol, butanol, octanol, dodecanol, and octadecanol, substituted alkanols, such as 2-dimethylaminoethanol, ethyleneglycol monoalkyl ethers, e.g. the Cellosolves such as 2-methoxy-, 2-ethoxy-, and 2-butoxyethanol, methyl glycolate, diethyleneglycol monoalkyl ethers, e.g. the Carbitols such as the methyl, ethyl, butyl and hexyl Carbitols, halo-substituted alcohols such as trifluoroethanol, 3-chloropropanol, 2,2,3,4-tetrafluoropropanol, and 2,2,3,3,3-pentafluoropropanol, 1-(4-chlorophenoxy)-2-propanol, 4-(2-methyl-4-chlorophenoxy)-1-butanol, benzyl alcohol, 2-phenylethanol, and 1 - (1 - methoxy - 2-propoxy)-2-propanols; those of cycloalkanols such as cyclohexanol, cyclopentanol, 4-cyclohexylcyclohexanol, and the like; those of unsaturated alcohols, such as allyl alcohol, propargyl alcohol, crotyl alcohol, undecenyl alcohol, and oleyl alcohol; those of heterocyclic alcohols, such as furfuryl alcohol and tetrahydrofurfuryl alcohol; and those of phenols, such as phenol, cresol, 2-allylphenol, 4-t-butylphenol, 4-octylphenol, 3,4-xylenol, 2-chlorophenol, 4-chlorophenol, and 4-methoxyphenol; and mixtures thereof.

Orthoborates of 1,2- or 1,3-glycols which can be used as catalyst components in this invention representatives include those borates of 1,2-propanediol, 2,3-butanediol, 2-methyl-1,2-propanediol, 1,3-propanediol, 1,3-butanediol, 2,4-pentanediol, 3-methyl-1,3-butanediol, 2-ethyl-1,3-hexanediol, and mixtures thereof.

Biborates derived from these glycols generally have the formula

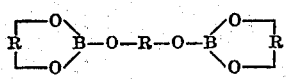

where R is alkylene with 2-10 carbon atoms, 2 or 3 of which atoms are connected in a straight chain between the oxygen atoms. Those derived from 1,3-glycols are particularly preferred because of their stability in the monomeric liquid forms.

The preferred orthoborates are those which normally are liquids, though those which are low melting solids (e.g., with melting points below 75° C.) can also be used with convenience.

The alcoholate or phenolate salts which are used as the other catalyst component of this invention are strongly basic and are preferably the alkali or alkaline earth metal salts, such as the sodium, potassium, lithium, calcium, magnesium, and barium salts. Quaternary ammonium alcoholates or phenolates can also be used. Representative salts which can be used include the metal salts of the aforementioned representative monohydric alcohols described above as useful in preparing the orthoborates. Generally, here, too, the preferred salts are those which are normally liquids or low melting solids, or are readily soluble in the borate component, since such salts will more readily react with the borate when admixed therewith to form tetracovalent catalysts of this invention.

The relative amounts of the two catalyst components can vary, depending upon the desired catalytic activity and viscosity of the resulting catalyst. Preferably, the amounts used will be sufficient to form a liquid, easy to handle and use. Such liquids can often be obtained by using the two components in stoichiometric amounts, i.e., one mole of boron per mole of alcoholate or phenolate. In some instances, it may be necessary to use more than a stoichiometric amount of boron to obtain a liquid catalyst or one with a pourable viscosity. Such an excess of boron (as borate) will generally serve to protect the catalyst from hydrolytic decomposition and moderate its activity. Use of less than a stoichiometric amount of boron, i.e., an excess of alcoholate or phenolate, will be of advantage in neutralizing acidic impurities in the isocyanate or polyol reactants. Such excess of alcoholate or phenolate will in some instances act as a co-catalyst and be useful in accelerating the trimerization or cure of such reactants. Generally, the mole ratio of boron to alcoholate or phenolate will be 0.5/1 to 100/1, preferably 1.2/1 to 10/1. To help solubilize the catalyst in the reactant material, it can be dissolved or dispersed in alcohol or a phenol, e.g. cresol.

The catalysts of this invention have a relatively long-shelf-life, e.g. 6 months or longer. Their activity, that is, the rapidity at which they gel the reaction mixture, can vary and will be dependent on the particular catalyst used, the relative ratio of boron to alcoholate or phenolate in the catalyst material, and the amount of the catalyst added to the reaction mixture. Room temperature cure will be desirable for some reactant systems and applications. In other cases, it may be desirable to have the catalyst active at elevated temperature, and thus catalysts which are capable of imparting a desirably long pot life to the reaction mixture or some degree of latency and activity at elevated temperatures will be applicable or preferred in some applications. The trimerization or polymerization reactions promoted by the catalysts of this invention are exothermic, and it should be understood that the terms "room temperature cure" or "elevated temperature cure" have reference to the temperature of the environment in which the reaction occurs, elevated temperature cures employing the application of external heat. Generally, the reaction systems catalyzed with the catalyst of this invention have moderately low heats of reaction, e.g. 20 to 50 calories per gram of reactant, such that runaway exotherms are not experienced, regardless of the magnitude of the reaction system. When the catalysts are admixed with the reactant system, intimate mixing can be achieved without formation of gel particles which otherwise might encapsulate the catalyst and thereby retard or prevent further cure of the system.

The trimerization of isocyanates, using the catalyst of this invention, can be carried out according to prior art manipulative techniques by admixing the isocyanate at room temperature, e.g. at 50 to 100° F., with the catalyst and allowing the trimerization to proceed at the autogenerous exothermic reaction temperature obtained upon said admixing, or at elevated temperatures, e.g. up to 200° C., to completion, or the trimerization can be interrupted or arrested to produce an isocyanurate product with free isocyanate functionality, and the product used as an NCO-prepolymer in preparing urethanes, such as disclosed in U.S. Pat. No. 3,280,066. The polymerization of polyisocyanate-polyol mixtures to form products with urethane and isocyanurate linkages can also be carried out by prior art manipulative techniques (generally involving first admixing the polyol with the catalyst) at low temperature or at elevated temperatures, e.g. 0 to 200° C., preferably 20 to 70° C. Convention fillers, co-catalysts, cross-linking materials, and other common additives can be incorporated into the polyisocyanate-polyol reaction mixture to obtain products having desirable properties.

The urethane-isocyanurate products can be made by the so-called "one-shot" method or can be made by the conventional two-step method in the case of foamed products, in which the polyol is first reacted with the polyisocyanate under anhydrous conditions to form a prepolymer, then water is added to form a foamed product or an inert gas is added as a blowing agent to supplement the gas formed by the reaction of water and —NCO groups. Or the inert gas can be used to provide all of the blowing (in which case the reaction mixture is maintained substantially anhydrous).

The isocyanate reactant materials used in this invention are known in the prior art (e.g. see U.S. Pat. No. 3,054,755) can be represented by the general formula $R(NCO)_n$, where R is aryl, alkyl, or cycloalkyl, and $n$ is 1 to 5. Preferred isocyanates are the aromatic isocyanates, Representative mono-isocyanates which can be trimerized to form isocyanurate compounds include phenyl isocyanate, benzylisocyanate, p-tolyl isocyanate, p-methoxyphenyl isocyanate, o-chlorophenyl isocyanate, p-nitrophenyl isocyanate, and p-phenylmethylene phenyl isocyanate. Polyisocyanates can also be polymerized or trimerized to form cross-linked polyisocyanurates, such polyisocyanates being trimerized per se with the catalyst of this invention or in admixture with a polyol. Representative polyisocyanates which can be used are aromatic polyisocyanates such as tolylene diisocyanate, diphenylmethane diisocyanate and xylylene diisocyanate. Tolylene diisocyanate, especially mixtures of the 2,4- and 2,6-isomers thereof, is particularly preferred in that it is readily reactive with the preferred polyols to give products having the desired properties, and is economically available commercially. Other suitable diisocyanates include m- or p-phenylene diisocyanate; 1,5-naphthalene diisocyanate; 4,4'-diphenylmethane diisocyanate; hexamethylene diisocyanate; 3,3'-dimethyl-4,4'-biphenylene diisocyanate; and dimer acid diisocyanate (DDI 1410, 36 carbon atoms, molecular weight 600). Other useful polyisocyanates include polyisocyanate compositions obtained by phosgenating the polyamines prepared by condensing formaldehyde with aromatic amines. Examples of polyisocyanates thus produced are the polymethylene polyphenyl isocyanates. A list of useful commercially available polyisocyanates is found in "Encyclopedia of Chemical Technology," Kirk-Othmer, 2nd ed., vol. 12, pp. 46–47, Interscience Pub., New York (1967).

NCO-capped prepolymers can also be trimerized with the catalyst of this invention to produce urethane-modified polyisocyanurates. Such prepolymers can also be used in admixture with polyols and the mixture catalyzed to produce products with urethane and isocyanurate linkages. Such NCO-capped prepolymers are well-known (see U.S. Pat. Nos. 3,073,802 and 3,054,755) and are generally prepared by reacting an excess of polyisocyanate, such as an aromatic diisocyanate, with polyalkylene ether glycols or polyester glycols. Prepolymers are sold under the trademarks Multrathane and Adiprene. The isocyanate can also be used in the form of a blocked isocyanate.

The polyol component of the polyisocyanate-polyol reaction mixture is preferably a low molecular weight polyalkylene ether polyol, but may also be a low molecular weight nonpolymeric polyol, or a polyester or polyester amide containing reactive hydroxyl groups. The preferred polyols have a molecular weight between about 250 and 3000. Polyols having a molecular weight up to about 5000 are useful. Where a hard product is desired, the polyol preferably should have an average polyol or hydroxyl equivalent weight between about 130 and 400 (i.e. one active —OH group per 130 to 400 molecular weight of polymer). Where softer more rubbery products are desired, the polyol may have one reactive —OH group per 400 to 1000 molecular weight of polymer. The rubbery products preferably should have a cross-link density of about 1 cross-link per 2000 to 20,000 atomic weight units, while the more rigid products have a cross-link density of about 1 cross-link per 400 to 2000 atomic weight units.

Examples of the preferred polyether polyols are polypropylene ether polyols or polybutylene ether polyols, such as the glycols represented by the formula $HO(RO)_nH$. Specifically the preferred polyalkylene ether polyols are condensates of ethylene, propylene, or butylene oxide with pentaerythritol, sorbitol, sucrose, methylglucosides, or low molecular weight polyols, such as propylene glycol, tri-, tetra-, penta-, hexamethylene glycols, 1,3-butylene glycol, 1,3-(2-ethyl) hexane diol, 2,2,4-trimethyl-1,3-pentanediol, trimethylol propane, 1,2,6-hexane triol, or phenyldiisopropanolamine. The low molecular weight polyols mentioned above can also be used, and preferably blended, with polymeric polyols as components in the reaction mixture.

Useful polyesters include castor oil, derivatives thereof, and those generally prepared by the esterification reaction of an organic dicarboxylic acid or anhydride with an alkylene oxide polyol. The preferred polyols are ethylene, propylene, and butylene oxide polyester polyols having two or more hydroxyl groups. The acid or anhydride may be selected from a wide variety of polybasic acids, such as malonic, succinic, glutaric, adipic, pimelic, sebacic, acids prepared by dimerization or trimerization of unsaturated eighteen carbon fatty acids, and others. The reactants are combined in molecular ratios to provide hydroxyl terminating groups on the polyester molecules. In the formation of these polyesters, it is quite common to provide mixtures of acids and anhydrides with mixtures of glycols and other polyols. The acid number may be controlled by methods known in the art, and is usually low, being under 5.

Generally, the polyol-polyisocyanate reaction mixtures cured with the catalyst of this invention can have NCO/OH equivalent ratios in the range of 1/1 to 12/1, and even higher, e.g., 20/1 to 40/1, preferably at least 1.2/1 since below the latter the product will contain unreacted or free hydroxyl groups (which have a plasticizing function) and will be a more flexible product. Products made from reaction mixtures having NCO/OH ratios of 1/1 to 1.2/1 can be characterized as isocyanurate-modified polyurethanes, the isocyanurate content generally being at least 1.0 wt. percent of the product. Those products made from reaction mixtures with NCO/OH ratios of 1.2/1 and greater, e.g., 3/1 to 12/1, can be characterized as urethane-modified polyisocyanurates, the isocyanurate content being generally at least 5.0 wt. percent of the product. The preferred products are those which are highly cross-linked by reason of having 20 to 80 percent of the —NCO groups of the polyisocyanate reactant converted into isocyanurate linkages. In general, regardless of the NCO/OH ratio, the mixed polyisocyanurate-polyurethane products of this invention have an amount of isocyanurate linkage in the polymer backbone sufficient to provide a heat stable product, i.e. a product which retains 75 to 100% of its room temperature hardness when heated at elevated temperature, e.g., 1 hour at 300–500° F.

The amount of catalyst used in polymerizing the isocyanate or polyol-polyisocyanate reaction mixtures of this invention will vary, depending on the particular catalyst reactant used, and the desired activity of the catalyst. Generally, the amount of catalyst to use will be less than 10 wt. percent of the isocyanate reactant, and usually from .05 to 2 wt. percent of the isocyanate. Functionally stated, the amount of catalyst to use will be that amount sufficient to catalyze the polymerization or trimerization of the reaction mixture at the desired temperature.

Where a higher cross-linked or chain-extended product is desired, the polyol-diisocyanate reaction mixture can include a conventional trifunctional isocyanate or a triol. The reaction mixture can also include modifying mono-isocyanates or alcohols such as 1,4-butane diol, butyl Cellosolve, butyl Carbitol, oleyl alcohol, etc., to impart special properties to the polymer product, such as the degree of final hardness.

Filled polymer products can be made by incorporating into the reaction mixtures a host of different powdered or finely divided fillers (e.g., 2 to 95 wt. percent) such as clay, talc, rubbery granular aggregate, titanium dioxide, diatomaceous earth, glass microbubbles and the like. Glass spheroids, e.g. see copending application Ser. No. 747,951, are useful in making light-weight isocyanurate-modified polyurethane syntactic foamed articles which can be finished by sanding, as described in copending application, Ser. No. 618,035. Co-reactant materials such as the diamines described in U.S. Pat. No. 3,248,454 and copending application Ser. No. 618,035, can be included in the polyol-polyisocyanate reaction mixture, e.g., to increase the viscosity or moldability thereof as well as to increase the hardness of the resulting product. Fire retardant fillers, such as polyvinyl chloride and antimony or phosphorous compounds can also be incorporated into the reaction mixture. Foamed or porous products of this invention, such as those having urethane as well as isocyanurate linkages, can be made by incorporating a small amount of water and/or by blowing the reaction mixture with a blowing agent such as Freon 11. Conventional foam stabilizing agents such as silicone oils or organosilicones can also be incorporated into such reaction mixtures to obtain foamed products with controlled porosity. A particularly useful foam stabilizer that can be used is a perfluoroalkyl amine, such as those disclosed in U.S. Pat. No. 3,378,399. Co-catalysts which can be used in conjunction with the catalysts of this invention, particularly in making room-temperature curable polyurethanes, include polyol soluble organic compounds and certain compounds of polyvalent metals, such as tin, lead, or mercury (see Brit. Pat. No. 1,053,383). Examples of such co-catalysts are phenylmercuric acetate, phenylmercuric oleate, mercuric octoate, mercuric naphthenate, lead octoate, lead naphthenate, dibutyl tin dilaurate, dibutyl tin diacetate, and similar compounds.

The polymeric products of this invention will generally have relatively high heat resistance and hydrolytic stability. They can range from soft solids to hard plastics. Elastomeric or rubbery materials can also be prepared.

The rubber or elastomeric urethane-isocyanurate products of this invention can be used to provide paving surfaces, particularly such as those tracks used for athletic or sporting purposes, and as coatings to provide protective surfaces, for example as rain-proof or water-resistant coatings for clothing. They can be used as laminating resins for sheets of glass fiber and as adhesives for bonding metal to metal, wood to wood, and metal to wood, and as potting compositions for insulating magnet coils or other electrical devices. The hydrolytic stability of the isocyanurate-urethane products of this invention means that they can be shaped in the form of articles that are subject to moisture contact during use or which come into contact with aqueous solvents or water, such as gaskets, seals, etc.

Objects and advantages of this invention are further illustrated by the following examples.

EXAMPLE 1

Two g. of the sodium salt of 2,6-di-t-butyl-p-cresol were added to 7.0 g. of tri-hexylene glycol borate (Borester 7) and the resulting mixture heated at 120° C., with periodic shaking, for about 15 min., during which time said sodium salt dissolved. On cooling to room temperature, the resulting tetracovalent borate salt catalyst was a syrupy, purple colored liquid.

An isocyanate-terminated prepolymer mixture was prepared by mixing together two different prepolymers, A and B, in a weight ratio of 3 parts A to 1 part B. Prepolymer A, having a viscosity of 450–950 cps. and an isocyanate equivalent of 171–175, was one that was prepared by reacting 67 parts of tolylene diisocyanate (Nacconate 80) with a mixture of 17.3 parts of a polypropylene ether glycol with a molecular weight of 200. Prepolymer B, having a viscosity of 64–148 poises and an isocyanate equivalent of 1700–1950, was one prepared by reacting 9.2 parts of tolylene diisocyanate with a mixture of 35.6 parts of a polyproplene ether glycol with a molecular weight of 3025 and 55.2 parts of a polypropylene ether triol with a molecular weight of about 6,000.

To 25 g. of said prepolymer mixture, 0.12 g. of the above acatalyst was added and mixed therewith at room temperature, and the resulting mixture then poured into a mold. The mold was centrifuged for 15 min. to remove air bubbles and then placed in a 167° C. oven for 1 hr. A bubble-free cured bar of an urethane-modified polyisocyanurate was removed from the mold after cooling, the bar having a Shore D hardness of about 75 and an Izod impact strength of 0.81 ft.-lb./in., the latter value being higher than that normally obtained with conventional epoxy resins.

EXAMPLE 2

A prepolymer mixture of 75 weight percent of said prepolymer A and 25 weight percent of said prepolymer B was mixed at room temperature with 0.3 weight percent of the catalyst of Example 1 and the mixture allowed to cure at room temperature. Another composition was similarly prepared but allowed to cure for 2 hrs. at 150° C. Electrical properties of the two cured urethane-modified polyisocyanurates were determined at different temperatures and are set forth below.

| Temp., ° C. | Dissipation factor (tan δ×10²) | | Dielectric constant (k) | |
| --- | --- | --- | --- | --- |
| | Sample cured at rm. temp. | Sample cured at 150° C. | Sample cured at rm. temp. | Sample cured at 150° C. |
| 23 | 1.8 | 1.8 | 4.18 | 4.11 |
| 51–54 | 1.9 | 1.8 | 4.37 | 4.33 |
| 76–77 | 2.1 | 1.9 | 4.42 | 4.35 |
| 100 | 1.7 | 1.6 | 4.18 | 4.16 |
| 125–127 | 2.4 | 2.2 | 4.23 | 4.16 |
| 150–151 | 5.5 | 5.3 | 4.37 | 4.27 |
| 170–175 | 11 | 20 | 4.53 | |
| 194 | 20 | | | |

The relatively low dissipation factors at elevated temperatures, especially for the sample cured at room temperature, and the constancy of the dielectric constant, indicate the cured products are very useful as an electrical insulating compound, especially where high temperatures are encountered.

EXAMPLE 3

Two electrical wires were spliced together and the splice placed in a closed-end plastic sleeve. A mixture like that of Example 2 was prepared and poured into the sleeve, the mixture curing at room temperature to a solid in about 30 min. After further curing for over a day at room temperature, the sleeve was removed, leaving the spliced wire embedded in an insulating cylinder of said urethane-modified polyisocyanurate resin.

In a similar fashion, a prepolymer mixture of 60 weight percent of said prepolymer A and 40 weight percent of said prepolymer B was mixed at room temperature with about 0.5 weight percent of said catalyst and the mixture used to encase and insulate a metal screwtype electrical socket and as a potting compound for electrical connections in a neon bulb, three wire receptacle circuit tester.

EXAMPLE 4

A series of different mixtures of said prepolymers A and B, each mixed at room temperature with 0.4 weight percent of the catalyst used in the above examples, was prepared and cured at 150° C. for 1 hr. to form solid urethane-modified polyisocyanurate products. Physical properties for these products are as follows:

| Run | Weight percent prepolymers in mixture | | Shore D hardness | Rockwell A hardness | Izod impact, ft. lb./in. | Rm. Temp. | | 300° F. | |
|---|---|---|---|---|---|---|---|---|---|
| | A | B | | | | Tensile, p.s.i. | Elongation, percent | Tensile, p.s.i. | Elongation, percent |
| 1 | 100 | 0 | 87 | 127 | 0.06 | 7,500 | 5 | 3,100 | 26 |
| 2 | 90 | 10 | | | | 6,500 | 6 | 3,000 | 24 |
| 3 | 80 | 20 | | | | 5,300 | 26 | 2,200 | 25 |
| 4 | 70 | 30 | 70 | 86 | 1.8 | 4,100 | 70 | 1,700 | 19 |
| 5 | 60 | 40 | 64 | 78 | 4.8 | 2,600 | 73 | 1,200 | 29 |
| 6 | 50 | 50 | 51 | | 5.7 | 2,000 | 123 | 800 | 40 |
| 7 | 40 | 60 | 38 | | 3.2 | 1,200 | 150 | 300 | 40 |

Products like those of Runs 3 and 6 were similarly prepared and cured, and then aged at 300° F. (150° C.) for 500 hrs. and 1000 hrs. Physical properties of these products are as follows:

| | Run 8 | Run 9 |
|---|---|---|
| Weight percent prepolymers: | | |
| Prepolymer A | 80 | 50 |
| Prepolymer B | 20 | 50 |
| Initial properties at— | | |
| Room temperature: | | |
| Tensile strength, p.s.i. | 5,700 | 2,200 |
| Elongation, percent | 13 | 63 |
| 300° F.: | | |
| Tensile strength, p.s.i. | 2,500 | 800 |
| Elongation, percent | 38 | 35 |
| Properties after 500 hrs. at 300° F.— | | |
| Room temperature: | | |
| Tensile strength, p.s.i. | 4,800 | 1,600 |
| Elongation, percent | 6 | 8 |
| 300° F.: | | |
| Tensile strength, p.s.i. | 2,900 | 800 |
| Elongation, percent | 11 | 10 |
| Properties after 1,000 hrs. at 300° F.— | | |
| Room temperature: | | |
| Tensile strength, p.s.i. | 5,700 | 2,200 |
| Elongation, percent | 6 | 5 |
| 300° F.: | | |
| Tensile strength, p.s.i. | 2,800 | 1,100 |
| Elongation, percent | 9 | 6 |

The above data show that the products have desirable physical properties both at room and elevated temperatures, even after prolonged exposure at elevated temperatures. Further, wide variation in properties can be obtained by varying the relative amounts of the prepolymers used.

EXAMPLE 5

Fifty g. of said prepolymer A was mixed at room temperature with a mixture of 50 g. of a polypropylene ether triol (Niax LG-56, having a molecular weight of 3000) and 0.5 g. of the catalyst used in the above examples. The mixture, having an NCO/OH equivalent ratio of 5.85/1, cured to a hard, tough solid urethane-modified polyisocyanurate within 30 min. at room temperature with a Shore D hardness of 50. The product essentially retained its strength after extended periods of time, e.g. one week, at 150° C. This product had good electrical properties (e.g., its dielectric constant, $k$, was 5.15 at 23° C. and 5.11 at 106° C.), making it useful as an electrical casting or potting resin.

EXAMPLE 6

Twenty-five g. of said prepolymer A was added to a mixture of 100 g. of polypropylene ether triol (TP-3030, having an equivalent weight of 1,000) and 0.62 g. of a catalyst prepared by dissolving 2.0 g. of 2,6-di-t-butyl-p-cresol in 10.0 g. of tri-hexylene glycol biborate (Borester 7), the resulting reaction mixture having an NCO/OH equivalent of 1.46/1. The reaction mixture was mixed at room temperature, centrifuged, and allowed to cure at room temperature. The resulting cured urethane-modified polyisocyanurate solid had a Shore A-2 hardness of 41.

In another run, 30 g. of said prepolymer A was mixed with a mixture of 100 g. of the same triol used above containing 0.65 g. of the same catalyst. The reaction mixture, having an NCO/OH equivalent of 1.75/1, was similarly cured to give a solid urethane-modified polyisocyanurate having a Shore A-2 hardness of 57.

In another run, 50 g. of the prepolymer A was mixed with a mixture of 100 g. of said triol and 0.75 g. of the said catalyst. The reaction mixture, having an NCO/OH of 2.92/1, was similarly cured to give a solid urethane-modified polyisocyanurate having a Shore A-2 hardness of 71.

EXAMPLE 7

One g. of sodium methoxide was added to and mixed with 10 g. of tri-hexylene glycol biborate (Borester 7), and the resulting mixture was heated at 150° C. for about 2 min., during which time the sodium methoxide dissolved. The resulting tetracovalent salt catalyst, when cooled, was a water-white syrupy liquid.

To 25 g. of a mixture of 75 weight percent of said prepolymer A and 25 weight percent of said prepolymer B was mixed at room temperature 0.11 g. of the above-prepared catalyst. The resulting mixture was poured into a mold. The mold was centrifuged for 15 min. and then placed in a 167° C. oven for 1 hr. After cooling, the solid bar of urethane-modified polyisocyanurate was removed from the mold and was found to have a Shore D hardness of about 75 and an Izod impact strength of 0.61 ft. lb./in.

EXAMPLE 8

To each of three jars was added 20 g. of a mixture of 60 weight percent said prepolymer A and 40 weight percent said prepolymer B. To Jar 1, 0.10 g. of the catalyst of Example 7 was added and mixed with the prepolymer mixture at room temperature. To Jar 2, 0.10 g. of the tri-hexylene glycol biborate was added, and to Jar 3, 0.10 g. of sodium methoxide was added. The jars were then placed in an oven and the nature of the products in the jars was observed in the oven as a function of time. Results are set forth below.

| Oven temp., ° C. | Elapsed time in oven | Nature of product | | |
|---|---|---|---|---|
| | | Jar 1 | Jar 2 | Jar 3 |
| 150 | 1.5 minutes | Solid | Liquid | Liquid. |
| 150 | 5 minutes | do | do | Do. |
| 150 | 10 minutes | do | do | Do. |
| 150 | 15 minutes | do | do | Do. |
| 110 | Overnight | do | do | Do. |

The above data show that the bioborate ester per se and the sodium methoxide per se are not active under the above conditions, whereas when they are admixed together, an active catalyst results.

EXAMPLE 9

Two 10 g. mixtures of 40 weight percent of said prepolymer A and 60 weight percent of said prepolymer B were placed in separate vials. Each mixture was then mixed at room temperature with 0.1 g. of the catalyst prepared in Example 1 or 7 and allowed to stand at room temperature, and the nature of the reaction mixture as a point of 270-276° C. The infrared absorption spectrum below.

| After mixing catalyst with prepolymer | Nature of cure | |
|---|---|---|
| | Using catalyst of Example 1 | Using catalyst of Example 7 |
| 0.5 minute | No change | Heat evolving. |
| 1.0 minutes | do | Solid product. |
| 2.0 minutes | do | Do. |
| 4.0 minutes | Started to heat | Do. |

The above data show that the stronger base, sodium methoxide, gave a catalyst more active at room temperature than the weaker base, sodium 2,6-di-t-butyl-p-cresolate.

EXAMPLE 10

To 25 g. of tolylene diisocyanate was added 0.12 g. of a catalyst prepared by dissolving 1.0 g. of sodium methoxide in 20 g. of tri-hexylene glycol biborate. The mixture was vigorously shaken and poured into a mold. The mold was centrifuged for 3 min. and contained a yellow-gold brittle solid, the infrared spectrum of which had bands consistent with an isocyanurate structure (no urethane bands were observed).

EXAMPLE 11

To 10 g. of phenyl isocyanate dissolved in 5 g. of toluene was added 0.1 g. of a catalyst prepared by dissolving 1.5 g. of sodium methoxide in 20 g. of tri-hexylene glycol biborate (Borester 7). The resulting mixture was mixed and in about 3 min. a white crystalline solid was formed. The solid was isolated, washed thoroughly with ether, and dried to give 4.75 g. of a white product having a melting point of 270-276° C. The infrared absorption spectrum of this product was consistent with triphenylisocyanurate (M.P. 281° C.).

EXAMPLE 12

A mixture of 20 g. of tri-cresyl borate, 2.0 g. of potassium o-chlorophenolate, and 5 g. of o-cresol was heated at 125° C. for 10 min., during which time said potassium salt dissolved. The mixture was cooled, resulting in a thick syrupy liquid containing some insoluble material. One g. of the top syrupy liquid was mixed with the same 3/1 mixture of prepolymers A and B used in Example 1, and the resulting reaction mixture was cured in a 100° C.-oven for 1 hr. to give a hard urethane-modified polyisocyanurate.

EXAMPLE 13

To 11 g. of dry hexyl Carbitol (diethylene glycolhexylether) was added 1.15 g. of sodium metal. The resulting mixture was heated at 110° C. until all the sodium dissolved. The mixture was then cooled to 30° C. and 25 g. of tri-butyl borate was added to give a syrupy water-white tetracovalent catalyst. One-hundred g. of the 3/1 mixture of prepolymers A and B used in Example 1 was mixed with 0.5 g. of this catalyst, the resulting reaction mixture curing to a solid urethane-modified polyisocyanurate in 12 min. at room temperature.

In another run, 0.03 g. of said catalyst was mixed with a mixture of 1.5 parts of said prepolymer A and 1 part of the triol used in Example 5. The reaction mixture (having an NCO/OH equivalent of about 9/1) cured in 5 min. at room temperature to form a solid urethane-modified polyisocyanurate.

Various modifications and alterations of this invention will become apparent to those skilled in the art without departing from the scope and spirit of this invention, and it should be understood that this invention is not to be unduly limited to the illustrative embodiment set forth herein.

We claim:
1. A process comprising polymerizing organic polyisocyanates in the presence of a catalyst comprising an orthoborate of a monohydric alcohol, 1,3-glycol, or monohydric phenol and an alkali metal alcoholate or phenolate salt.

2. The process according to claim 1 wherein said catalyst has the formula

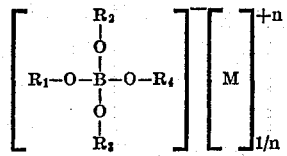

where $R_1$, $R_2$, and $R_3$ are alkyl or phenyl radicals of said orthoborate, $R_4$ is an alkyl or phenyl radical of said alcoholate or phenolate, M is an alkali metal cation thereof, and $n$ is the valence of said cation.

3. The process according to claim 2 wherein M is sodium or potassium.

4. The process according to claim 2 wherein said orthoborate is an orthoborate of a 1,3-glycol.

5. The process according to claim 2 wherein said orthoborate is a biborate of the formula

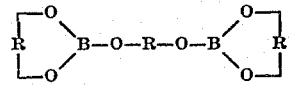

where R is alkylene with 2-10 carbon atoms, 3 of which are connected in a straight chain between the oxygen atoms.

6. The process according to claim 2 wherein said orthoborate is tri-hexylene glycol biborate.

7. The process according to claim 2 wherein said orthoborate is tri-cresyl borate.

8. The process according to claim 2 wherein said orthoborate is tri-butyl borate.

9. The process according to claim 2 wherein said alcoholate is sodium methoxide.

10. The process according to claim 2 wherein said phenolate is the sodium salt of 2,6-di-t-butyl-p-cresol.

11. The process according to claim 2 wherein said alcoholate is the sodium salt of diethylene glycolhexylether.

12. The process according to claim 1 wherein said polyisocyanate is a diisocyanate.

13. The process according to claim 1 wherein said polyisocyanate is an isocyanate-capped polyoxypropylene polyol.

14. The process according to claim 1, wherein said polyisocyanate is an isocyanate-capped prepolymer formed by reacting an excess of an aromatic diisocyanate with a polyalkylene ether glycol, and said prepolymer is in admixture with a polyalkylene ether polyol.

15. The process according to claim 1, wherein the resulting reaction mixture is subjected to a temperature sufficient to form a polyisocyanurate product.

16. A process comprising polymerizing organic polyisocyanates in the presence of a catalyst comprising tri-hexylene glycol biborate in admixture with the sodium salt of 2,6-di-t-butyl-p-cresol.

17. The process according to claim 16 wherein the mol ratio of boron to sodium salt of said catalyst is 1.2/1 to 10/1, said polyisocyanate is an isocyanate-capped prepolymer formed by reacting an aromatic diisocyanate with a polyalkylene ether glycol, and said prepolymer is in admixture with a polyalkylene ether polyol.

18. A process comprising polymerizing organic polyisocyanantes in the presence of a catalyst comprising (1) orthoborate of a 1,3-glycol in admixture with an alkali metal alcoholate or phenolate salt, (2) an orthoborate of a monohydric phenol in admixture with an alkali metal phenolate salt, or (3) an orthoborate of monohydric alcohol in admixture with an alkali metal alcoholate.

19. The process according to claim 18 wherein said catalyst comprises an orthoborate of a monohydric phenol in admixture with an alkali metal phenolate salt.

20. The process according to claim 18 wherein said catalyst comprises an orthoborate of a monohydric alcohol in admixture was an alkali metal alcoholate.

21. The process according to claim 18 wherein said catalyst comprises an orthoborate of a 1,3-glycol in admixture with an alkali metal alcoholate or phenolate salt.

22. The process according to claim 18 wherein said catalyst comprises tri-hexylene glycol biborate in admixture with an alkali metal alcoholate.

References Cited

UNITED STATES PATENTS

| | | | |
|---|---|---|---|
| 3,020,262 | 2/1962 | Speranza | 260—47 |
| 3,077,494 | 2/1963 | Griffith | 260—471 |
| 3,280,049 | 10/1966 | Hyre et al. | 260—2.5 |
| 3,422,036 | 1/1969 | Ellegast et al. | 260—2.5 |
| 3,458,483 | 7/1969 | Dubsky et al. | 260—783 |
| 3,487,080 | 12/1969 | Matsui et al. | 260—248 |

OTHER REFERENCES

Noller—Chemistry of Organic Compounds—W. G. Saunders Co., (Pennsylvania), 1951, pp. 690–691.

DONALD E. CZAJA, Primary Examiner

H. S. COCKERAM, Assistant Examiner

U.S. Cl. X.R.

260—2.5 AW; 161—190

UNITED STATES PATENT OFFICE
CERTIFICATE OF CORRECTION

Patent No. 3,697,485      Dated October 10, 1972

Inventor(s) Rambosek, et al

It is certified that error appears in the above-identified patent and that said Letters Patent are hereby corrected as shown below:

Column 3, line 36, "2,2,3,4-" should read -- 2,2,3,3- --.

line 51, "representatives" should read -- representatively --.

Column 5, line 5, "Convention" should read -- Conventional --.

Column 8, line 18, "actalyst" should read -- catalyst --.

Column 10, line 64, "bioborate" should read -- biborate --.

Column 11, line 1 and 2 should read -- function of time was observed. Results are set forth below --.

Column 13, line 3, "was" should read -- with --.

Signed and sealed this 10th day of April 1973.

(SEAL)
Attest:

EDWARD M. FLETCHER, JR.
Attesting Officer

ROBERT GOTTSCHALK
Commissioner of Patents